Aug. 13, 1957  T. R. JOHNSON  2,802,724
COMBINED DRY CHEMICAL DISSOLVER AND FEEDER
Filed April 5, 1956
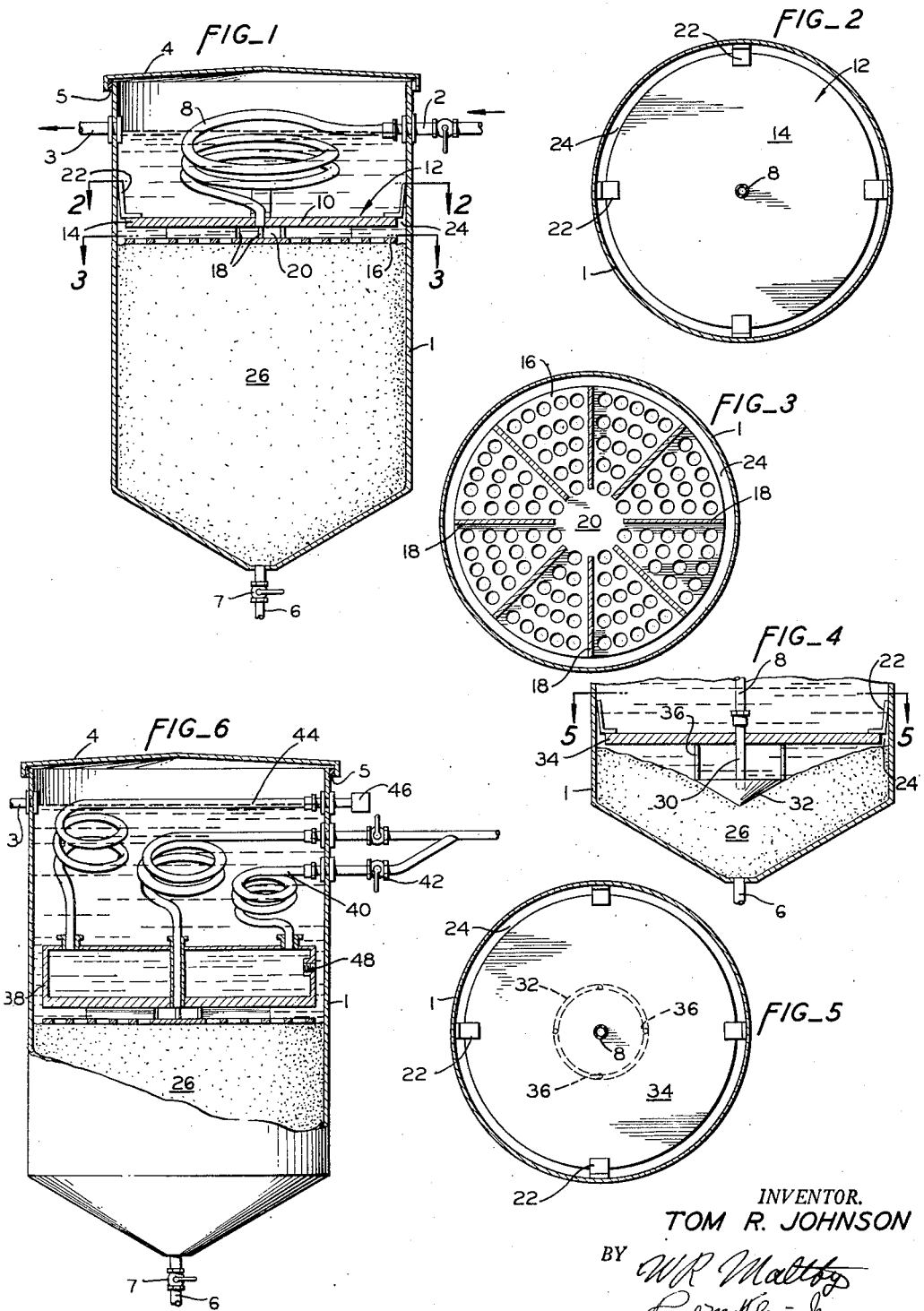
INVENTOR.
TOM R. JOHNSON

United States Patent Office 2,802,724
Patented Aug. 13, 1957

2,802,724

COMBINED DRY CHEMICAL DISSOLVER AND FEEDER

Tom R. Johnson, San Diego, Calif.

Application April 5, 1956, Serial No. 576,507

7 Claims. (Cl. 23—267)

(Granted under Title 35, U. S. Code (1952), sec. 266)

The invention described herein may be manufactured and used by or for the Government of the United States of America for governmental purposes without the payment of any royalties thereon or therefor.

This invention relates to an apparatus for dissolving dry chemicals and feeding the solution formed thereby, and more particularly to an apparatus wherein the dry chemicals are dissolved at a constant controlled rate in a closed pressure system.

Prior art equipment for mixing, for example, soluble dry powders with liquids and then feeding the mixture to a desired location usually requires several steps: pumping liquid into a tank, mechanically or manually adding the powder, mixing the powder or pellets and liquid by mechanical agitation, and pumping the mixed solution to reestablish desired pressure suitable for feeding, as by spraying through nozzles. This type of equipment suffers from the defects that the process is not continuous, since filling and mixing cannot be accomplished while discharging the prepared mixture; the concentration of the final solution is not automatically controlled; the mechanical agitator and discharge pump must be of special construction to prevent corrosion when preparing corrosive solutions; and the original line pressure is lost during mixing, thus requiring repumping of solution after mixing.

The principal objects of the present invention are to provide an apparatus for accomplishing the desired results with no significant loss of water pressure; automatic proportioning of chemical to water with fluctuating pressure or quantity of water flow; complete exhaustion of the dry chemical charge with no significant fluctuation of percentage of dry chemical dissolved; continous as opposed to intermittent feed; and no corrosive effect on pumping apparatus.

Other objects and many of the attendant advantages of this invention will be readily appreciated as the same becomes better understood by reference to the following detailed description when considered in connection with the accompanying drawing wherein:

Fig. 1 is a vertical cross-section of a preferred embodiment of the invention;

Fig. 2 is a cross-section of the embodiment of Fig. 1 taken along the line 2—2;

Fig. 3 is a cross-section of the embodiment of Fig. 1 taken along the line 3—3;

Fig. 4 is a partial view of a vertical cross-section of another embodiment of the invention using a weight disc assembly different from that of Fig. 1;

Fig. 5 is a view taken along the line 5—5 in Fig. 4; and

Fig. 6 is a vertical cross-section of another preferred embodiment of the invention wherein the weight disc assembly includes a buoyancy tank.

Reference is now made to the drawing. Numeral 1 indicates a tank, conveniently but not necessarily cylindrical in shape, having a fluid inlet 2 and a fluid outlet 3. The tank is provided with a loading opening equipped with a cover 4 shown conveniently as located at the top of the tank. The cover can be hinged, if desired, and is equipped with a gasket 5 and appropriate fasteners (not shown) to make a pressure-tight seal with the tank. If desired, the tank can be provided with a drain 6 and associated valve 7. A fluid, such as water, can be conducted from the inlet opening 2 through conduit means 8, preferably a flexible tube or hose, and thence delivered into the tank 1 at a region below the top surface 10 of a weight disc assembly generally indicated at 12. The weight disc assembly comprises a weight disc 14 and perforated plate 16. The plate 16 is provided with spacers 18 extending from the upper surface thereof, and the disc 14 is attached by any convenient means such as welding to the tops of these spacers. The spacers are arranged to provide channels through which fluid can flow in the region between the plate 16 and the disc 14 and can, for this purpose, be conveniently arranged in a radial pattern with adjacent spacers separated from one another so as to provide free access to fluid discharged into the region 20 and from which region the fluid can distribute itself radially outward between the plate and disc. To maintain the weight disc assembly in a generally horizontal orientation, guides 22 are provided to engage the tank 1. The plate disc assembly is proportioned and arranged to generally span the horizontal cross-sectional interior area of the tank 1 but is sufficiently smaller than this area to leave a space, such as the annulus 24, for fluid flow between the periphery of the assembly and the adjacent surface of the tank 1. When the tank is chosen to be cylindrical, as in Fig. 1, the weight disc assembly conveniently assumes a circular or cylindrical form also. The weight disc assembly rests on the material 26 which has been loaded into the tank and is to be dissolved and fed out of the tank.

Operation

To operate the device of this invention, the valve 7 is closed, the hinged cover 4 is opened, and the weight disc assembly is lifted out, leaving the hose 8 attached thereto. The tank 1 is charged with dry chemicals 26 and the assembly 12 is then replaced on top of the dry chemicals and the hinged cover 4 is locked into closed position. Water or other solvent under pressure is introduced through the inlet 2 and flows through the tube or hose 8, thence through the opening in the disc 14 and radiates out through the spaces formed by the spacers 18 between the disc 14 and the plate 16. The solvent in passing through the perforations in the plate 16 comes into contact with the dry chemicals and dissolves them, after which the solution passes through the annular space 24 and thence through the outlet 3. The weight of the weight disc assembly 12 will by force of gravity cause descent of the assembly as the top surface of the chemicals dissolves. The hose 8 is long enough to allow descent of the assembly to the bottom of the tank as the chemicals are exhausted. After the chemicals are exhausted, solvent flow into the inlet 2 is shut off and the tank can be drained by valve 7 after which it is ready for recharge and repeat of the operation. Another preferred embodiment shown in Figs. 4 and 5 uses a jet of solvent issuing from a nozzle 30 distributed by impinging against a baffle 30, preferably concave, to accelerate the dissolving of chemical 26 and effect, in some instances, a better proportional dissolving than the perforated plate 16. The baffle 32 is supported beneath the weight disc 34 by supports 36 spaced to allow free flow of liquid.

Still another embodiment of the invention is shown in Fig. 6. In this embodiment the weight disc assembly includes a buoyancy tank 38 which, in effect, is merely added to the plate-disc assembly of Fig. 1. This embodiment is particularly useful with certain chemicals which, when wetted, become soft and soupy and do not provide constant desirable resistance to the descent of the weight disc assembly but allow it to settle too rapidly, or spasmodically, and thus prevent the desired constant dissolving of the surface area. Other chemicals tend to dissolve more rapidly on one side of the container thus tending to tip the assembly and again destroy the constant dissolving area relationship. With the arrangement of Fig. 6, these undesirable effects are avoided. The embodiment of Fig. 6 includes a supply conduit 40 to which water or the like can be admitted through valve 42 and an air release conduit 44 through which air can be released from the interior of chamber 38 by any suitable means such as an automatic air bleeder 46. For draining the chamber 38 a drain plug 48 is provided.

The operation of the embodiment of Fig. 6 is generally the same as that of Fig. 1. At the beginning of the operation the buoyancy tank 38 is empty and when the weight disc assembly is placed on top of the dry chemical 26 to control the rate at which the weight disc assembly sinks and thus the rate at which the chemicals 26 are dissolved, use is made of the valve 42 admitting water to the buoyancy tank and the air bleeder 46 releasing air from the tank are used. At the end of a cycle the bouyancy tank 38 is emptied by use of the plug 48.

Obviously many other modifications and variations of the present invention are possible in the light of the above teachings. It is, therefore, to be understood that within the scope of the appended claims the invention may be practiced otherwise than as specifically described.

What is claimed is:

1. A device of the character described comprising a tank having a displaceable cover for loading the tank; a weight disc assembly conformed to generally span the horizontal cross-sectional interior area of said tank but sufficiently smaller than said area to leave a space for fluid flow between the periphery of said assembly and the adjacent surface of said tank; said tank having substantially imperforate bottom and side portions adapted to retain a body of material loaded in said tank; said assembly being adapted to rest on said body of material loaded in said tank whereby said body of material is confined by and in direct contact with said assembly, said bottom portion, and said side portions; and conduit means connected to conduct fluid from a location exterior to said tank and deliver said fluid into said tank from said assembly at a region below the top surface of said assembly against only the upper surface of said material; said tank having a discharge opening in the upper region thereof.

2. The device of claim 1 wherein said assembly comprises a perforated plate to rest in contact with material loaded in said tank, said plate having spacers extending from the upper surface thereof; and a weight disc mounted on said spacers, said spacers providing channels for fluid flow in the region between said plate and said disc out beyond the peripheries of said plate and disc.

3. The device of claim 2 wherein said spacers extend radially of said assembly and wherein said spacers are separated from each other so that fluid delivered to the central region of said assembly between said plate and said disc can distribute itself from said central region outward between said spacers.

4. The device of claim 1 wherein said conduit means includes a flexible tube lying above said assembly and connected to conduct fluid down from the top of the disc of said assembly through said disc and to discharge said fluid beneath the underside of said disc.

5. The device of claim 4 wherein said assembly includes guides engaging said tank to maintain said assembly in generally horizontal orientation.

6. The device of claim 1 wherein said assembly includes means for producing a jet of liquid emanating from the region of the lower surface of the disc of said assembly; and a baffle carried by said assembly and concave toward said jet and so placed as to distribute the stream from said jet to assist said liquid to mix with the material loaded in said tank.

7. The device of claim 1 wherein said assembly includes a buoyancy tank; and wherein there are provided controllable means for admitting liquid to said buoyancy tank, controllable means for releasing air from buoyancy tank, and means for draining said buoyancy tank.

References Cited in the file of this patent

UNITED STATES PATENTS

| 26,717 | Sulton | July 3, 1860 |
| 275,128 | Bronner | Apr. 3, 1883 |

FOREIGN PATENTS

| 227 | Great Britain | Jan. 26, 1857 |